UNITED STATES PATENT OFFICE.

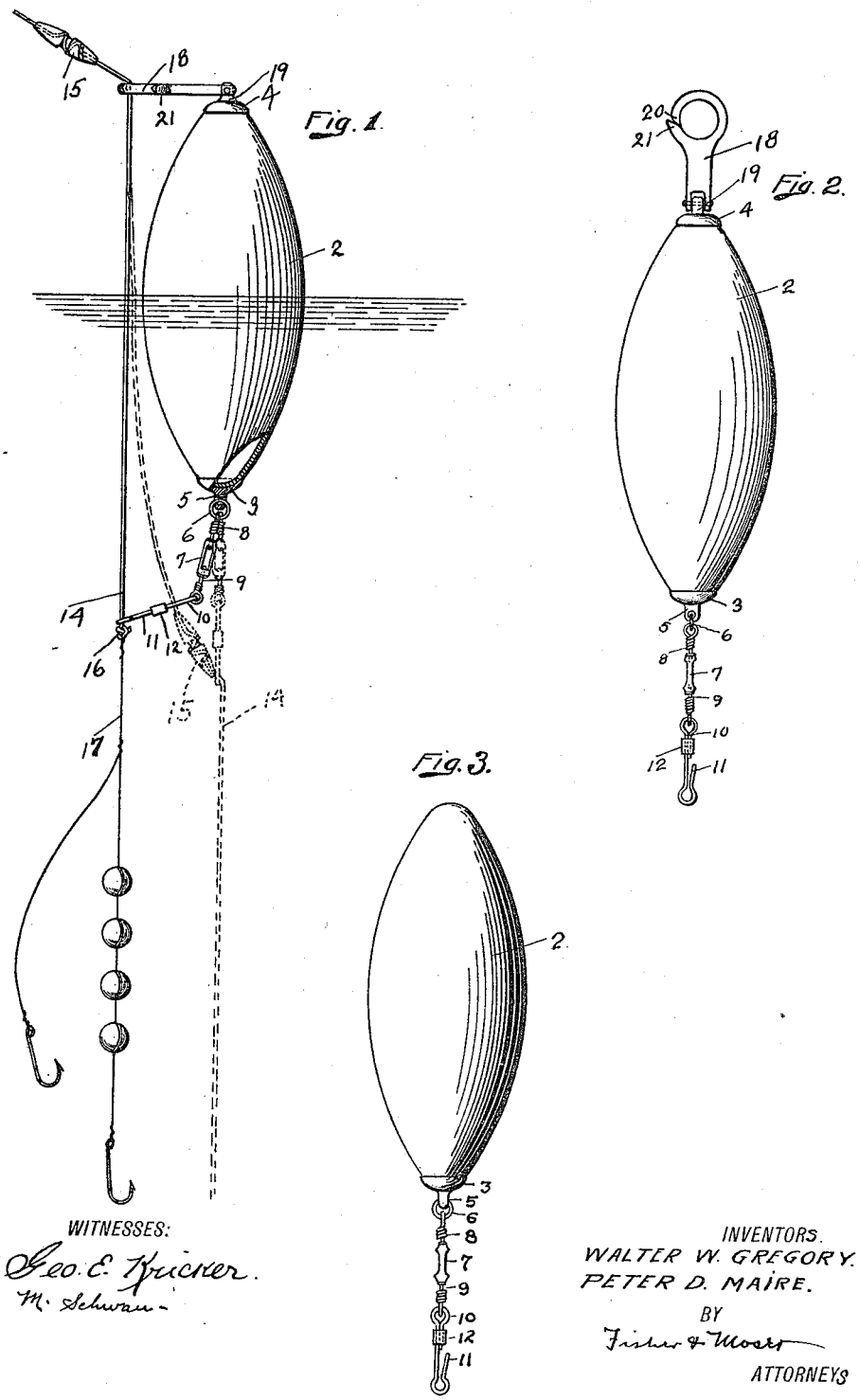

WALTER W. GREGORY AND PETER D. MAIRE, OF LAKEWOOD, OHIO; SAID MAIRE ASSIGNOR TO W. R. WHITE, OF CLEVELAND, OHIO.

FISHING BOB OR FLOAT.

1,193,684.  Specification of Letters Patent.  Patented Aug. 8, 1916.

Application filed January 27, 1915. Serial No. 4,583.

*To all whom it may concern:*

Be it known that we, WALTER W. GREGORY and PETER D. MAIRE, citizens of the United States, residing at Lakewood, in the county of Cuyahoga and State of Ohio, have invented certain new and useful Improvements in Fishing Bobs or Floats, of which the following is a specification.

Our invention pertains to improvements in fishing bobs or floats, and the improvement comprises a bob or float having means at one end or both ends whereby a fishing line may be detachably coupled in running engagement with the float without fouling the line or preventing a circular play of the float around the line, all substantially as hereinafter shown and described and more particularly pointed out in the claims.

In the accompanying drawing, Figure 1 is a side view of our improved bob or float connected with a fishing line, and Fig. 2 is a side elevation viewed at right angles to Fig. 1. Fig. 3 is a side view of a float embodying our improved flexible connection at the lower end thereof and without a top coupling for the line.

The invention comprises a bob or float 2 preferably made of celluloid or other light-weight and waterproof materials, and the float as shown is hollow and of ellipsoidal formation with small reinforcements or caps 3 and 4 at its opposite ends. Said caps are molded or secured to the main body of the float in any suitable way, and bottom cap 3 has an eye 5 integral therewith extending downward on the axial center of the float. A wire link 6 is permanently connected with eye 5, and a yoke 7 has a swivel connection 8 at one end with said link. The opposite end of yoke 7 is connected by a second swivel member 9 with stem 10 of a snap hook 11 made of light spring wire, and a sleeve 12 is slidably mounted on the stem 10 to cover the joint and prevent the snap hook from opening, except when such result is intentionally desired. The swiveled and linked members described provide a flexible connection whereby the float may be conveniently detached from and attached to a fishing-line 14 and when connected the float is free to turn on its own axis and also free to swing in any direction relatively to the line, and the line may be shifted at will without entangling the line. The line has free running engagement with the snap hook 11 within predetermined limits fixed by an adjustable stop 15 and the knot 16 of the leader or weighted hook-carrying extension 17. Stop 15 fixes the depth to which the hook end of the line may descend into the water by engagement with the snap hook 11, see dotted lines, Fig. 1, and knot 18 limits the free run of the line upward by also striking the snap-hook; the float remaining in the water during this proceeding, but being lifted out of the water with the leader or hook end of the line whenever that action occurs. When casting the line the float bears against knot 16 until the float strikes the water whereupon the float remains on the surface and the weighted portion of the line sinks until the stop member 15 engages the snap-hook 11. A running engagement of the line may also be had with the upper end of the float. This is optional with the user but for that purpose we pivotally connect a fishing-line coupling or snap-ring 18 to the lug or ear 19 on cap 4 at the upper end of the float body, said ring being split tangentially and provided with a projecting lip or enlargement 31 opposite and outside of the division line to facilitate entrance of the line to the central opening of the ring while attaching and detaching the line. The snap-ring may be made of celluloid as this material possesses excellent spring properties enabling the rounded tongue portion 20 of the ring to flex inwardly and also laterally for passage of the line. Quick and convenient attachment and detachment of the line is also afforded thereby, but when the snap-ring is projected laterally as seen in Fig. 1, the line is securely confined and free to run through the ring, including the stop member 15 which is smaller than the ring opening.

What we claim is:

1. A bob or float and fishing-line couplings pivoted directly at the ends thereof and adapted to swing laterally to either side from the bob and the extremities of said couplings having openings to thread a line through the same in free running engagement therewith.

2. A fishing bob or float having a swiveled snap hook pivoted on one end and adapted to provide a rotatable and quick-detachable connection for a fish-line and a flexible coupling pivoted directly on the other end thereof, and said snap hook and coupling constructed to thread a line through the ends thereof and to have running engagement therewith within limits.

3. A bob or float comprising a thin light hollow air tight body having a metallic reinforcement permanently secured to each end thereof and a fish-line attachment pivotally engaged with each of said reinforcements and constructed to have running engagement of the line through the outer ends thereof.

In testimony whereof we affix our signatures in presence of two witnesses.

WALTER W. GREGORY.
PETER D. MAIRE.

Witnesses:
R. B. MOSER,
M. SCHWAN.

Copies of this patent may be obtained for five cents each, by addressing the "Commissioner of Patents, Washington, D. C."